US007956740B2

(12) United States Patent
Myers et al.

(10) Patent No.: US 7,956,740 B2
(45) Date of Patent: Jun. 7, 2011

(54) ALARM SYSTEM CONFIGURATION VALIDATION

(75) Inventors: Timothy Myers, Prince Albert (CA); Sascha Kylau, Sonya (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 535 days.

(21) Appl. No.: 12/193,063

(22) Filed: Aug. 18, 2008

(65) Prior Publication Data

US 2010/0039255 A1 Feb. 18, 2010

(51) Int. Cl.
*G08B 13/00* (2006.01)
*G08B 23/00* (2006.01)
*G06F 11/00* (2006.01)

(52) U.S. Cl. .......... 340/541; 340/517; 340/521; 714/25; 714/36; 714/37; 714/39

(58) Field of Classification Search ........................ None
See application file for complete search history.

(56) References Cited

U.S. PATENT DOCUMENTS

| | | | | |
|---|---|---|---|---|
| 3,838,408 | A * | 9/1974 | McMaster | 340/501 |
| 5,955,946 | A | 9/1999 | Beheshti et al. | |
| 6,298,454 | B1 | 10/2001 | Schleiss et al. | |
| 2002/0126009 | A1 * | 9/2002 | Oyagi et al. | 340/541 |
| 2004/0236991 | A1 * | 11/2004 | Brundridge et al. | 714/25 |
| 2008/0014869 | A1 | 1/2008 | Demirbasa et al. | |

* cited by examiner

*Primary Examiner* — Julie Lieu
(74) *Attorney, Agent, or Firm* — Smart & Biggar

(57) ABSTRACT

An alarm system validates values of configuration variables, such as a programmed account code. If the variable(s) is/are not programmed upon exiting system programming, an audible and/or visual indication of such is provided. This may result in a decrease of the number of events signaled to a central station by alarm systems that are not programmed with the correct account code.

18 Claims, 6 Drawing Sheets

ALARM SYSTEM CONFIGURATION VALIDATION

FIELD OF THE INVENTION

The present invention relates generally to alarm systems, and more particularly to alarm systems that allow for easier and more consistent installation and configuration.

BACKGROUND OF THE INVENTION

Home and business alarms have become commonplace. Such alarms (often referred to as "security systems" or "alarm systems") typically include several sensors used to monitor unauthorized entry and other conditions at monitored premises, such as fire, smoke, toxic gases, high/low temperature (e.g. freezing) or flooding, at a premises. In response to sensing an alarm condition, one or more of these sensors provides a signal to an alarm panel that in turn may sound and notify the occurrence of the alarm to occupants of the premises and remotely signal a monitoring station or other third party.

Typically the occurrence of an alarm is signalled to a remote monitoring station that may then dispatch capable authorities to intervene at the premises. For example, in the case of sensing an unauthorized entry to the premises, the monitoring station may dispatch security personnel, typically in the form of private security guards or police officers.

In order for the alarm system to properly signal the monitoring center, the system must be properly installed and configured. Installation requires installing a central panel; placing sensors; ensuring the sensors and panel are provided with a source of power; connecting the central panel with a communications network; pairing the sensors to the panel; and programming the panel to place a communication to the monitoring center in the case of an alarm.

In view of the numerous steps involved to properly install and configure a typical alarm, errors are often made. In particular, the alarm system is often not correctly programmed to contact the monitoring center, and signal an alarm condition.

For example, customers/installers often forget to program the account code. When this happens and a communication takes place, the panel dials the central station and logs the event. However this event is associated with the default account (such as FFFF). If this occurs at more than one panel, then multiple events all having the same account code are received at the central station. The central station cannot uniquely identify the alarmed premises and dispatch personnel This may create mass confusion and result in a field call to visit the site and program the account code.

Accordingly there is a need for alarm systems that allow for more consistent installation and configuration.

SUMMARY OF THE INVENTION

Exemplary of embodiments of the present invention, an alarm system validates a programmed account code. If the account code is not programmed upon exiting system programming, an audible and/or visual indication of such is provided. This may result in a decrease of the number of events signaled to the central station by alarm systems that are not programmed correctly.

In accordance with an aspect of the present invention, there is provided a method of configuring an alarm system at a premises. The method comprises: placing the alarm system into a configuration mode; accepting through a keypad values of configuration variables in the configuration mode; sensing an exit condition from the configuration mode; upon the sensing the exit condition, validating at least some of the values of configuration variables, to ensure the alarm system has been adequately configured; and in response to determining that the alarm has not been adequately configured, signalling a configuration error condition audible or visible at the keypad.

In accordance with another aspect of the present invention, there is provided an alarm system at a monitored premises, comprising: a control panel; a plurality of sensors in communication with the control panel, each of the sensors for sensing a monitored alarm condition; a keypad for configuring the alarm system; a processor operable to place the alarm system into a configuration mode; accept through a keypad values of configuration variables; sense an exit condition; and upon the sensing the exit condition validate at least some of the values of configuration variables, to ensure the alarm system has been adequately configured.

In accordance with yet another aspect of the present invention, there is provided an alarm system at a premises. The monitored premises comprises: means for placing the alarm system into a configuration mode; means for accepting values of configuration variables in a configuration mode; means for sensing an exit condition for exiting the configuration mode; means for validating at least some of the values of configuration variables, to ensure the alarm system has been adequately configured upon the sensing said exit condition; and means for in response to determining that the alarm has not been adequately configured, signalling a configuration error condition audible or visible at the keypad.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
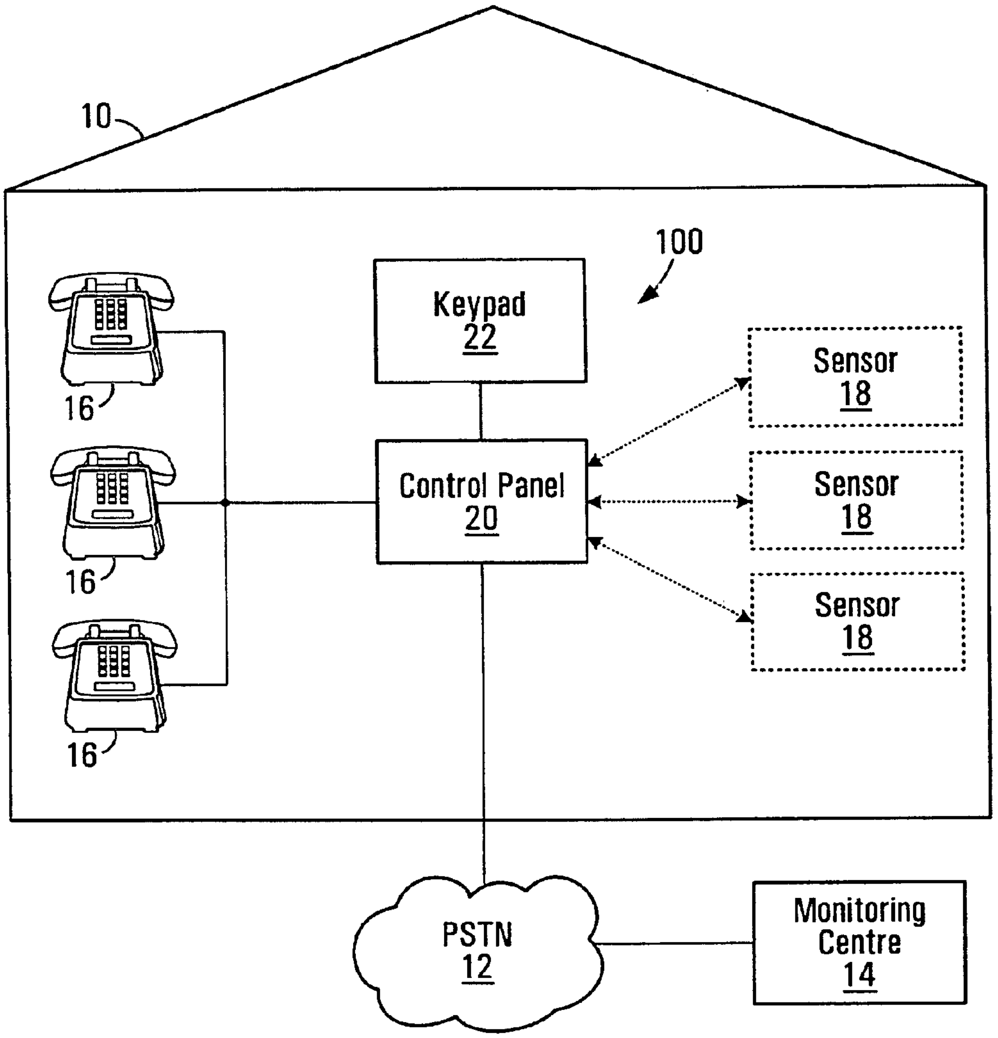
FIG. 1 is a schematic diagram of an alarm system at a monitored premises, exemplary of an embodiment of the present invention.

FIG. 1 depicts a residential or business premises 10 guarded by an alarm system 100 including a central panel 20 in communication with a plurality of sensors 18. System 100 may, for example, take the form of a DSC® Powersystem alarm, such as a DSC® Power632; Power832; Power864; DSC® PC1616, PC1832 or PC1864, or other similar commercially available alarm systems, modified in manners exemplary of embodiments of the present invention Sensors 18 may be entry sensors, flood sensors, motion detectors, smoke detectors, glass breakage sensors, or any other sensors to be monitored, as appreciated by those of ordinary skill. Alarm system 100 further includes a keypad 22 that is interconnected with panel 20. In the depicted embodiment, keypad 22 is physically separate from panel 20, but could otherwise be integrated with panel 20. Sensors 18 and keypad 22 may be in communication with panel 20, wirelessly, by a wired interconnect, through the electric wiring of premises 10, or otherwise. Alarm system 100 may further include other interfaces such as additional key pads, sirens, and the like, not specifically illustrated in FIG. 1.

Panel 20 is further interconnected with a conventional communications network. In the depicted embodiment, panel 20 is interconnected with the public switched telephone network (the PSTN) 12 and may be in communication with one or more other communication network(s), through a network interface module 28. Alternatively, or additionally panel 20 may be interconnected with another network (not specifically illustrated) in the form of a cellular telephone network or data network, or the like. A suitable cellular network may, for example, be a GPRS/GSM cellular network, and as such be considered a GSM network and GPRS network. A suitable data network may take the form of a wide area wireless data network, a wired data network such as the internet, or the like.

Telephones 16 at premises 10 may be interconnected through control panel 20 to PSTN 12. In this way, control panel 20 may disconnect telephones 24 from PSTN 12, and have unfettered access to PSTN 12.

A monitoring center 14 is also in communication with PSTN 12 and optionally the other communication network. Monitoring center 14 is depicted as a single monitoring center in FIG. 1. Monitoring center 14 could be formed of multiple monitoring stations, each different at physical locations. For example, some monitoring stations could be in communication with the alternate communications network, others in communication with PSTN 12. Monitoring center 14 is associated with one or more PSTN telephone numbers, and optionally other network addresses, such as a cellular network or data address, that may be used to contact monitoring center 14 to provide data indicative of a monitored event, at a monitored alarm system, such as the alarm system including panel 20 at premises 10. Typically, monitoring center 14 is manned with personnel, equipped to respond to signalled alarms from premises 10 (and other similarly equipped premises) and dispatch police, fire or other emergency personnel.

Figure 2:
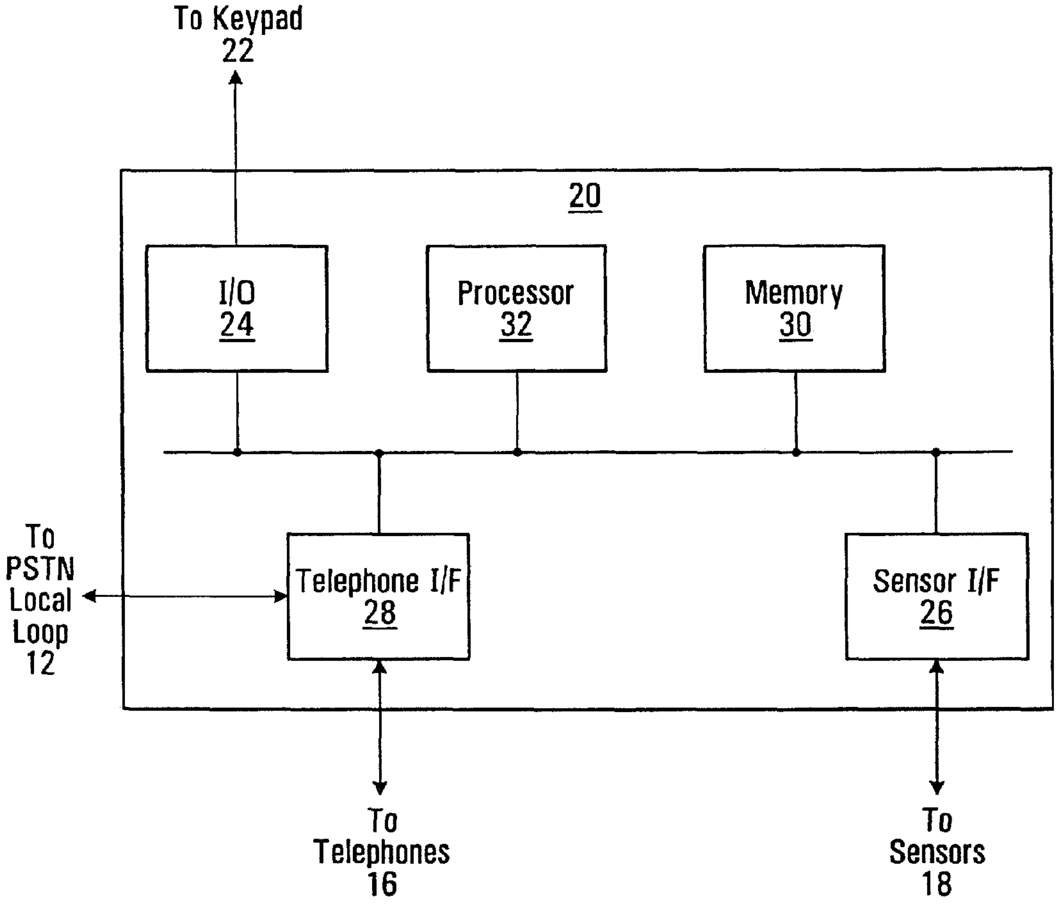
FIG. 2 is a schematic block diagram of an alarm panel of the system of FIG. 1.

Example alarm panel 20 is more particularly illustrated in FIG. 2. As illustrated, alarm panel 20 includes a central processor 32 in communication with memory 30 and a sensor interface 26. A network interface 28 is further in communication with processor 32. Network interface 28 may be interconnected with telephone feed for the remainder of premises 10 and PSTN 12. Sensor interface 26 may communicate with sensors 18 by wires, wirelessly, over electrical wiring, or otherwise. A general purpose input/output interface 24 may connect keypad 22 to panel 20. Panel 20 may further include conventional components (not shown), such as a power supply, antennal, and the like.

Software controlling the operation of processor 32, and hence panel 20, may be embedded in processor 32 or may be stored in memory 30 external to processor 32. Memory 30 may be any suitable combination of persistent storage memory (e.g. ROM, flash memory, disk memory, or the like) and random access memory (e.g. flash random access memory, dynamic random access memory, or the like). This software may control overall operation of panel 20, including its interaction with sensors 18 and keypad 22. More specifically, the software causes alarm panel 20, through interface 28 to place one or more outgoing telephone calls after detection of an alarm event. Prior to placing the outgoing call, interface 28 may disconnect the telephones 16 from PSTN 12. Typically, the alarm event represents the tripping of one of sensors 18 when alarm panel 20 is in its armed state.

Figure 3:
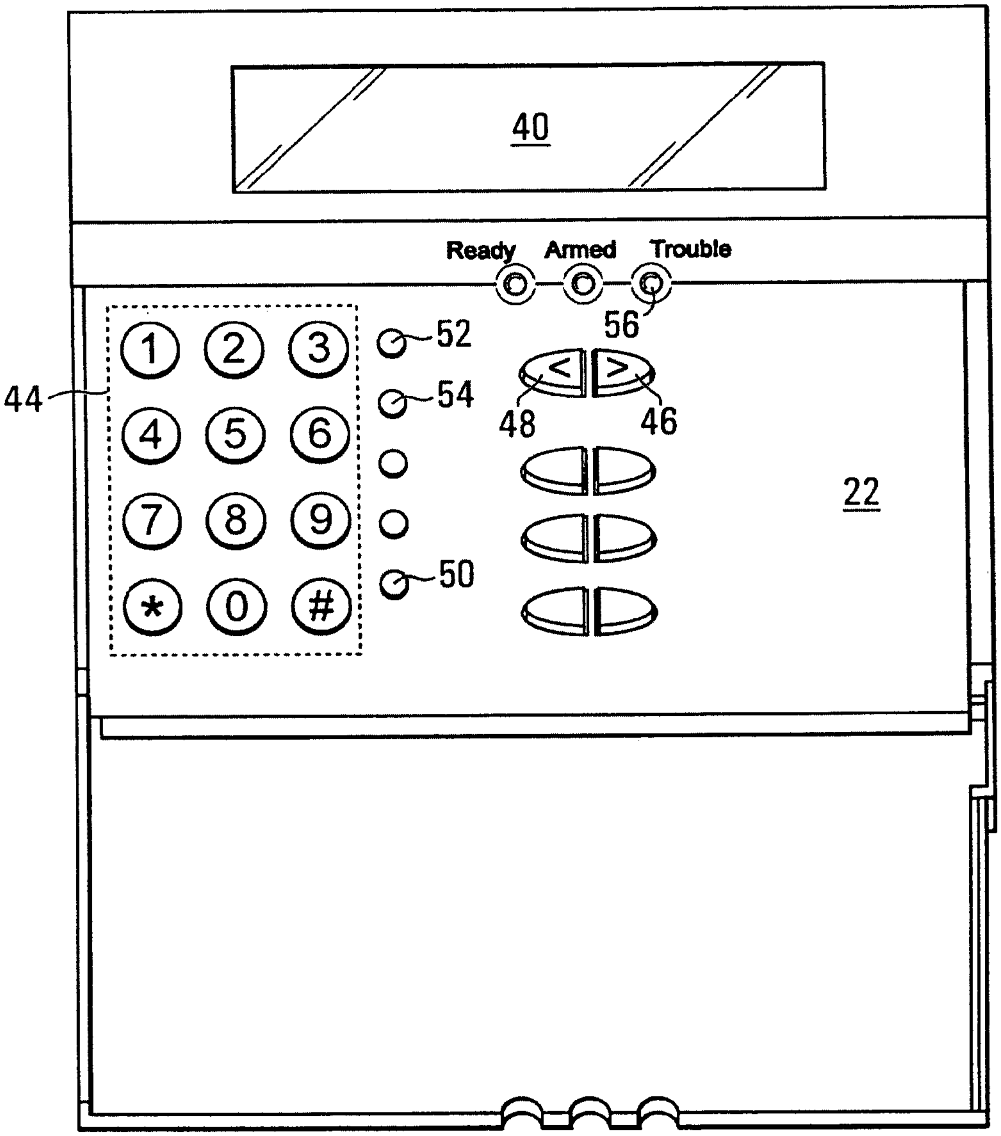
FIG. 3 is a diagram of a keypad of the alarm system of FIG. 1.

An example keypad 22 is depicted in FIG. 3. As illustrated, example keypad 22 includes a display 40 such as an LCD or LED display capable of presenting several lines of text. Keypad 22 serves to arm and disarm panel 20, and signal status of alarm system 100. As will become apparent, keypad 22 also allows an installer to configure alarm system 100. Example keypad 22 is wired to panel 20. Notably, keypad 22 further includes numeric entry keys 44, scroll forward key 46, scroll backward key 48, exit key 50, and arm/disarm key 52, 54. Keypad 22 may further include other keys providing a specialized user interface functions (not specifically detailed herein). Keypad 22 may include a display driver (not shown) to drive display 40, and a keyboard interface (also not specifically shown), each of which may be formed as integrated circuits. Each key stroke may be communicated to panel 20 by the keyboard interface, and panel 20 may in turn control presentation of text and the like on display 40. Keypad 22 may also include an audio transducer, such as a speaker or piezo electric transducer useful for generating audible signals at keypad 22. Also, keypad 22 may include a separate light, such as an LED 56 for producing a visible signal at keypad 22.

Installation and programming of panel 20 and sensors 18 may be effected in a conventional manner. For example, installation of the DSC® Power1864 alarm system is detailed in DSC® Power1864 Installation Manual, and DSC® Power1864 Programming Worksheets, the contents of which are hereby incorporated by reference.

Once panel 20 and sensors 18 have been physically installed at premises 10 to be monitored by an installer, system 100 may also be configured by the installer. As will be appreciated, installation of panel 20 and sensors 18 may require physical installation of panel 20 and sensor 18, their interconnection, and where required, interconnection with a source of power.

Figure 4A:
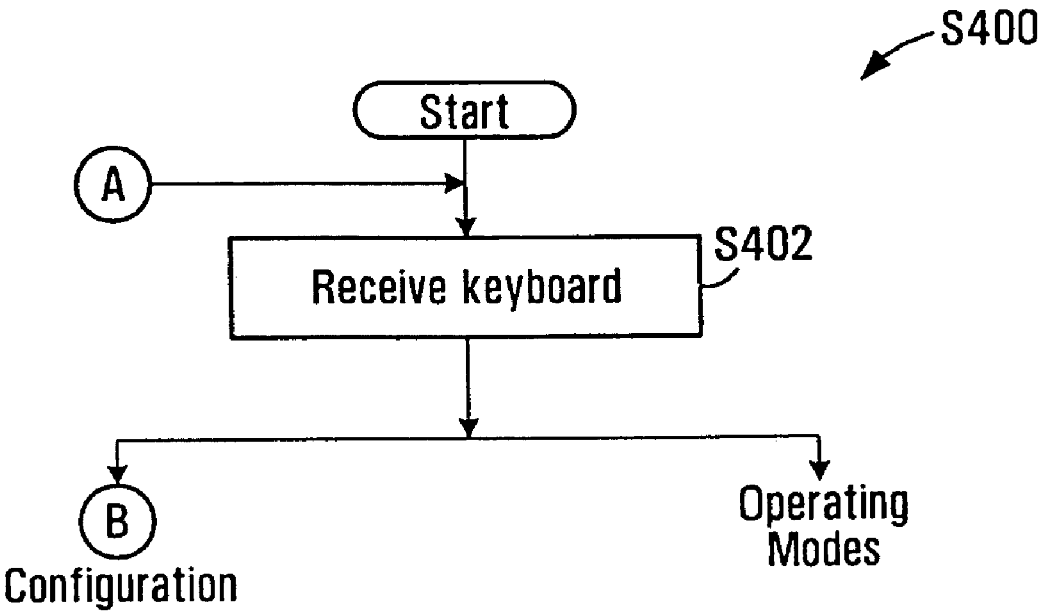
FIGS. 4A-4C are flow charts of the execution of software blocks at the alarm system of FIG. 1.
Figure 4B:
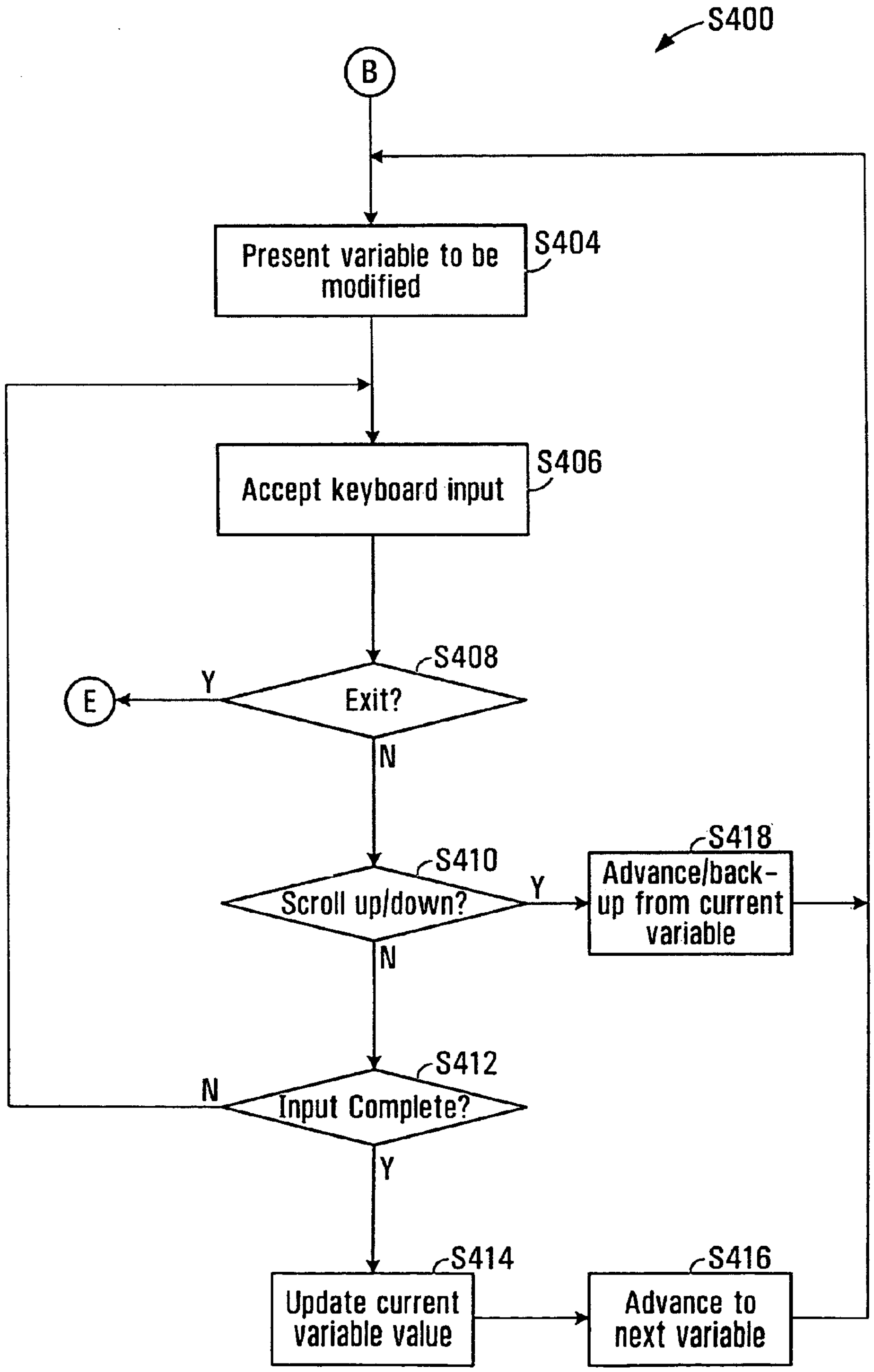
Figure 4C:
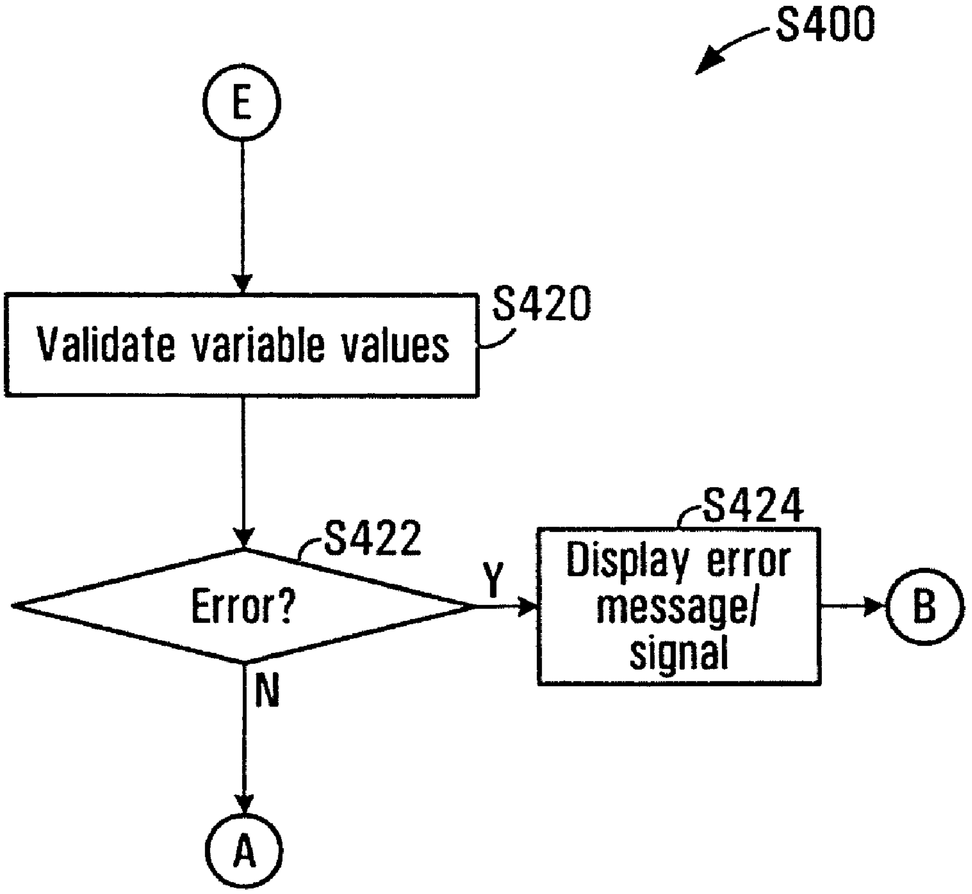

Software blocks S400 executed by system 100 during configuration are illustrated in FIGS. 4A-4C.

As illustrated, in FIG. 4A, system 100 may be placed into armed/disarmed operating modes, or a configuration mode from keypad 22. Operating modes will not be further detailed herein.

Configuration mode, allowing configuration of system 100 may be achieved by entering an operator code at panel 22, received at keypad 22 and panel 20 in block S402 Once configuration mode has been entered in blocks S404 and onward, panel 20 causes display 40 to display a value and a name/significance of a variable to be configured in block S404. Values of variables may be used by software controlling operation of panel 20, and may be stored in memory 30. An installer may, for example, change the value of the configuration variable using numeric entry keys 44 in block S406. The operator may also selectively scroll through multiple configuration and alter each of the various configuration settings using scroll forward/back keys 46, 48, or other suitable keys as detected in block S410. In response the current variable being configured is advanced, or moved back in block S418 and blocks S404 and onward are repeated for the next current variable.

Example variable values may be numeric, alphanumeric or binary. Each variable may have a defined bit or byte size, governed by the software controlling operation of system 100. Example variables that may be set include alarm zones, installer and operator codes, system timers, phone numbers to be dialled in case of an alarm; account codes; alarm reporting codes, custom reporting codes, communication format options, tamper reporting codes; and the like. Additional codes may be system dependent. Example configuration variables are again detailed in DSC® Power1864 Programming Worksheets. As each configuration variable is altered or set, the new variable valuable may be stored within memory 30 in block S414. Input for a particular configuration variable may be assessed as complete in block S412, as a consequence of entering a pre-defined number of keystrokes or pressing a non-numeric key (e.g. #, *) or otherwise. The current variable may be advanced in S416, and blocks S404 and onward may be repeated.

Now, to end configuration, an exit event signalling an exit from the configuration mode may be signalled at keypad 22 and sensed in block S408. For example, exit key 50 may be pressed, or an exit event may otherwise be signalled. For example pressing the arm/disarm keys 52, 54 may signal an exit event. Pressing a reset key may signal an exit event. Or closing a cover of keypad 22 may signal an exit event. Likewise, lack of operator interaction for a defined time period may signal an exit event.

In manners exemplary of embodiments of the present invention, an exit event causes processor 32 to validate some or all configuration variable values, as illustrated in FIG. 4C. Typically, at least enough configuration variable values may be validated to ensure that system 100 has been adequately configured to meaningfully operate. For example, processor 32 may validate variable values stored within memory 30. All or selected variable values may be validated. For example, the installer entered system account code may be validated to ensure that a factory preset default code has been replaced with another account code. Alternatively or additionally, the format of the account code or other variable values could be verified to ensure it conforms to an expected format. For example, the account code could be verified to have certain properties—e.g. check sum; number of zeros; parity; upper or lower value; or the like. Other variable values may be similarly validated in block S420. Likewise, phone numbers to be dialled may be validated to verify that factory settings at panel 20 have been updated. Optionally, as the account code is only (or primarily) used to identify alarm system 100 to a monitoring center, verification of the account code may only be performed after the phone number(s), network address, or other network identifier, of the monitoring center to be contacted upon sensing an alarm condition has(ve) been verified.

If the variable values are validated successfully—i.e. if variable values meet expected criterion or criteria as determined in block S422—panel 20 may exit its configuration mode and may again await being placed into one of its operating mode or configuration mode in block S402 (FIG. 4A). Any previously signalled configuration error may also be cleared (e.g. a message may be turned off or an illuminated light may be extinguished).

If the variable values are not successfully validated, as determined in block S422, panel 20 may signal a configuration error in block S424, by for example generating a suitable message at keypad 22 for display on display 40. Alternatively, another visual or audible indicator could be provided at keypad 22. For example, a light, such as LED 56 could be lit. An error condition could be sounded at a piezo or speaker of keypad 22, or the like. At the same time, panel 20 may prevent the installer from exiting the configuration menu, and block S404 and onward may be repeated (FIG. 4B). In particularly, the mis-configured variable could be treated as the current variable and be presented in block S404. As blocks S404 are repeated, alarm system 100 is effectively prevented from assuming its normal operating state (e.g. armed or disarmed).

In this way, an installer is made aware of a failure to properly configure system 100/panel 20, and may also be prevented from arming system 100, thereby signalling an incomplete installation process.

Once armed, sensors 18 and panel 20 interact in a conventional manner. As a particular sensor 18 is tripped signifying a sensed condition, the sensor provides a signal, wirelessly or through wired interconnect to panel 20. Panel 20, in turn, places a network communication, typically in the form of a call, to a pre-programmed telephone number to contact monitoring center 14, typically by way of PSTN 12.

The outgoing telephone call or calls may be placed to monitoring center 14 or any other alternate number (such as a subscriber number) by dialling a stored PSTN telephone number. Different sensed conditions may be associated with different PSTN number(s), thereby allowing different sensed conditions to be signalled to different monitoring stations, alternate numbers, or the like.

Once a pre-programmed number has been called, processor 32 generates a suitable message to the recipient. For example, if the called numbed is a monitoring center (such as monitoring center 14), data representative of the sensed alarm may be generated, encapsulated, and passed to monitoring center 14. The data, for example, may be encapsulated using any one of a number of modulation techniques. For example, the data may be passed to the monitoring center as a series of dual-tone, multi-frequency ("DTMF") tones using, for example, the SIA Protocol (as specified in the ANSI SIA DC-03-1990.01 Standard, the contents of which are hereby incorporated by reference), the ContactID Protocol, or as modulated data, modulated as pulses, or on a carrier frequency. If the number called is a subscriber number, processor 32 may generate a voice message to be heard by the subscriber.

The message to monitor center 14 includes the unique system account code of panel 20, as entered during configuration and validated in blocks S400. At monitoring center 14, the unique system account codes may be used as a key to identify records associated premises 10. In this way, the alarm system 100 originating the message may be uniquely identified at monitoring center 14, among many alarm systems.

Once an alarm has been signalled, monitoring center 14 may dispatch personnel or the police to premises 10. Data stored at monitoring center 14 may identify the address of premises 10. Monitoring center 14 may further place a call to one or more designated telephone numbers (also stored at monitoring center 14) to notify the owner of premises 10 (or his/her designee) of the sensed alarm condition.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of configuring an alarm system at a premises, the method comprising:

placing said alarm system into a configuration mode;

accepting through a keypad values of configuration variables in said configuration mode;

sensing an exit condition from said configuration mode;

upon said sensing said exit condition, validating at least some of said values of configuration variables, to ensure said alarm system has been adequately configured; and in response to determining that said alarm has not been adequately configured, signalling a configuration error condition audible or visible at said keypad.

2. The method of claim 1, further comprising preventing said alarm system from assuming an operating state in response to determining that said alarm has not been adequately configured.

3. The method of claim 1, wherein said signalling comprises presenting a message at said keypad.

4. The method of claim 1, wherein said signalling comprises illuminating a light at said keypad.

5. The method of claim 1, wherein said validating at least some of said values of configuration variables, comprises verifying that at least some of said values of configuration variables have been altered from factory preset values.

6. The method of claim 1, wherein said validating at least some of said values of configuration variables, comprises verifying that at least some of said values of configuration variables adhere to an expected format.

7. The method of claim 1, wherein said at least some of said values of configuration variables comprises a unique system account code used to identify said alarm system at a monitoring center in communication with said alarm system.

8. The method of claim 7, wherein said at least some of said values of configuration variables comprises a network identifier of said monitoring center, and wherein said unique system account code used to identify said alarm system is verified after said network identifier of said monitoring center has been verified.

9. An alarm system at a monitored premises, comprising:

a control panel;

a plurality of sensors in communication with said control panel, each of said sensors for sensing a monitored alarm condition;

a keypad for configuring said alarm system;

a processor operable to place said alarm system into a configuration mode;

accept through a keypad values of configuration variables; sense an exit condition; and upon said sensing said exit condition validate at least some of said values of configuration variables, to ensure said alarm system has been adequately configured.

10. The alarm system of claim 9, further comprising a network interface used to signal said monitored alarm conditions to a monitoring center.

11. The alarm system of claim 9, further comprising a text display for displaying a message indicating that said alarm system has not been adequately configured.

12. The alarm system of claim 11, wherein said text display forms part of said keypad.

13. The alarm system of claim 9, wherein said processor prevents said alarm system from assuming an operating state in response to determining that said alarm has not been adequately configured.

14. The alarm system of claim 9, further comprising a light and wherein said signalling comprises illuminating said light.

15. The alarm system of claim 9, wherein said processor is operable to verify that at least some of said values of configuration variables have been altered from factory preset values.

16. The alarm system of claim 9, wherein said processor is operable to verify that at least some of said values of configuration variables adhere to an expected format.

17. The alarm system of claim 9, wherein said at least some of said values of configuration variables comprises a unique system account code used to identify said alarm system at a monitoring center in communication with said alarm system.

18. An alarm system at a premises, the monitored premises comprising:

means for placing said alarm system into a configuration mode;

means for accepting values of configuration variables in a configuration mode;

means for sensing an exit condition for exiting said configuration mode;

means for validating at least some of said values of configuration variables, to ensure said alarm system has been adequately configured upon said sensing said exit condition; and means for in response to determining that said alarm has not been adequately configured, signalling a configuration error condition audible or visible at said keypad.

* * * * *